Figure 6A:
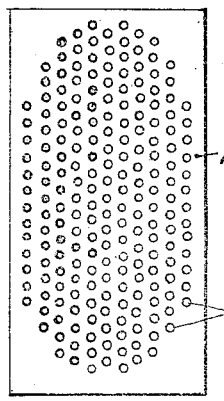

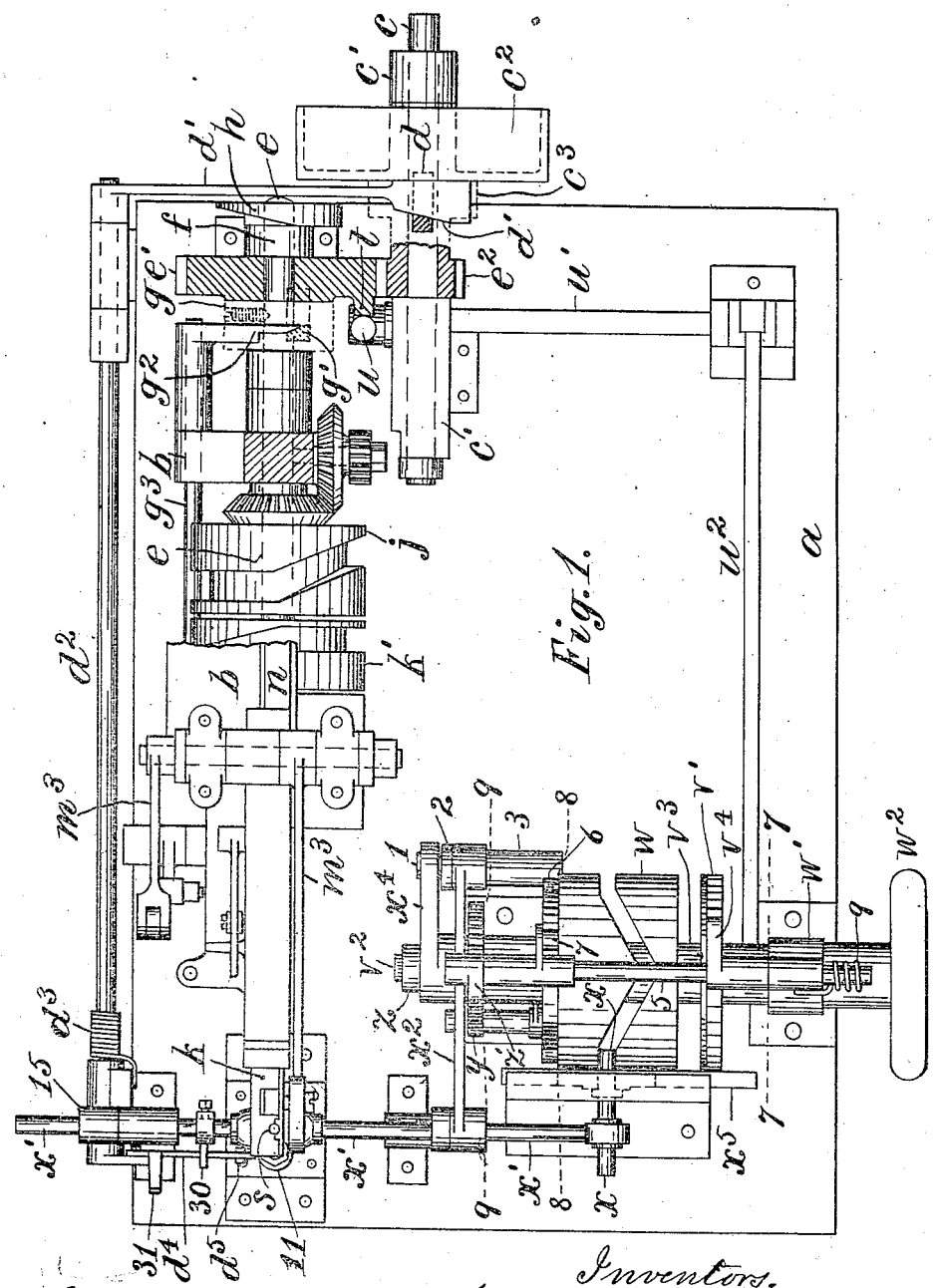

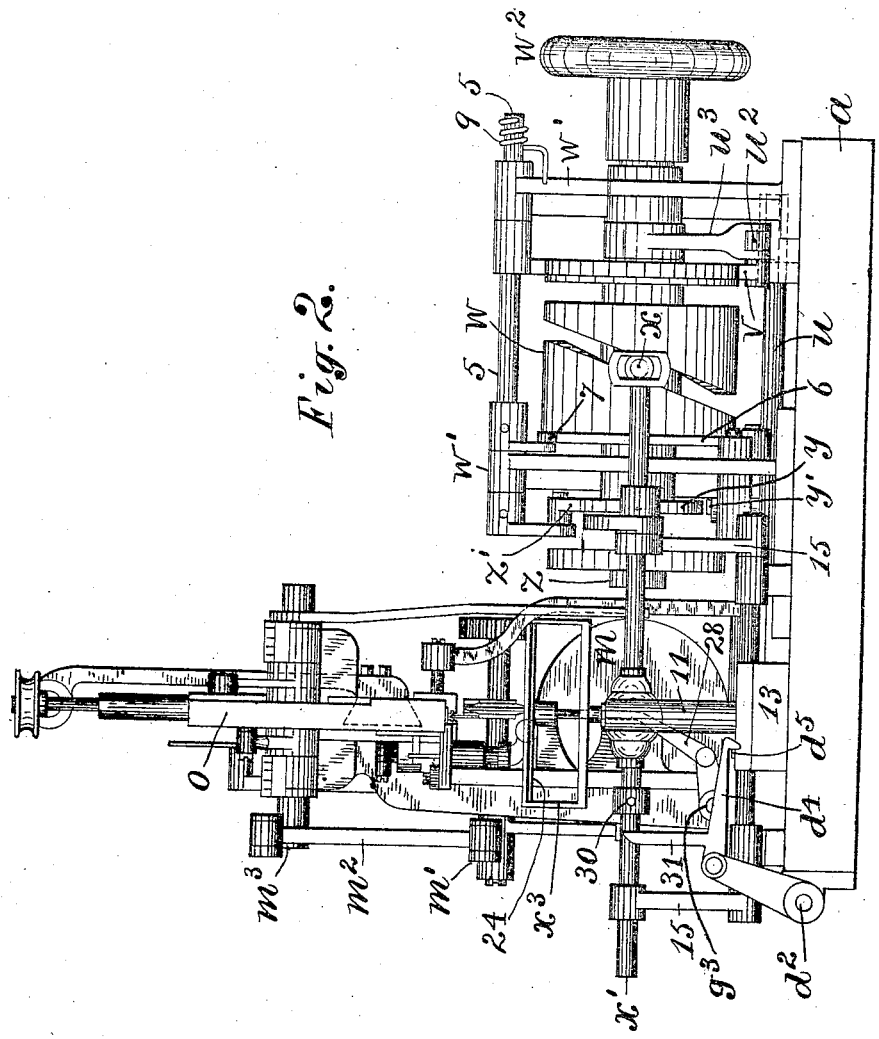

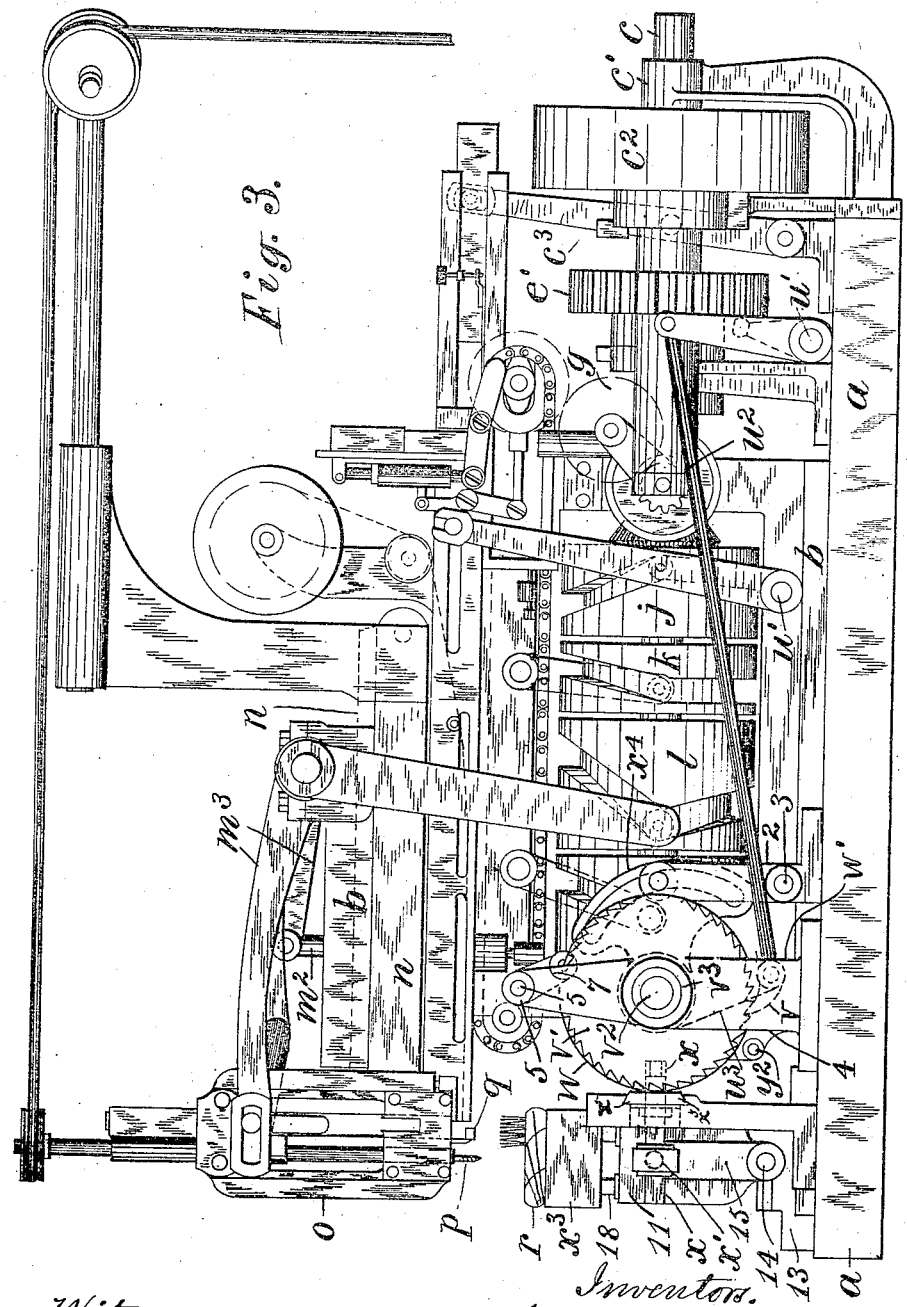

No. 855,811. PATENTED JUNE 4, 1907.
M. O. REHFUSS & E. F. BUCH.
APPLIANCE FOR FEEDING BRUSH BLOCKS.
APPLICATION FILED DEC. 20, 1905.
7 SHEETS—SHEET 4.
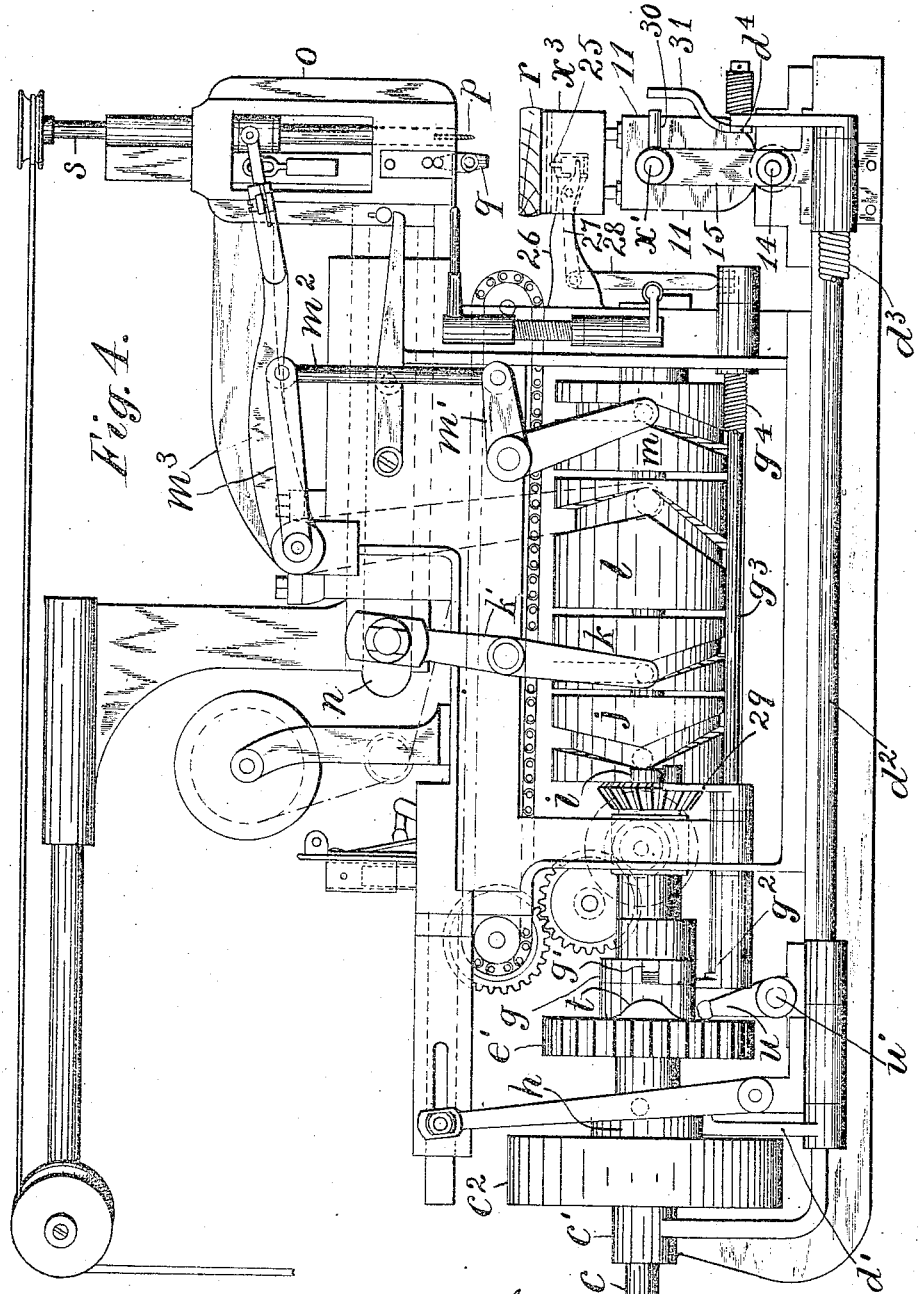

No. 855,811. PATENTED JUNE 4, 1907.
M. O. REHFUSS & E. F. BUCH.
APPLIANCE FOR FEEDING BRUSH BLOCKS.
APPLICATION FILED DEC. 20, 1905.
7 SHEETS—SHEET 5.
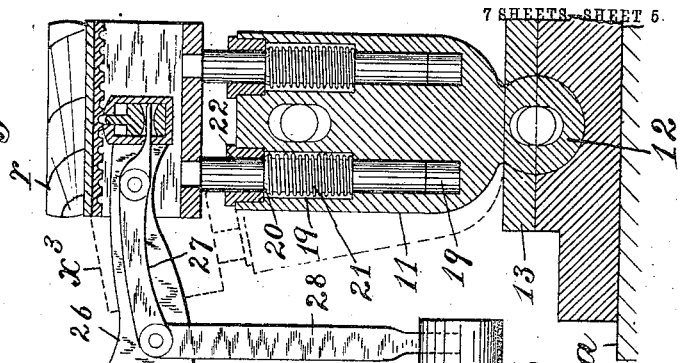
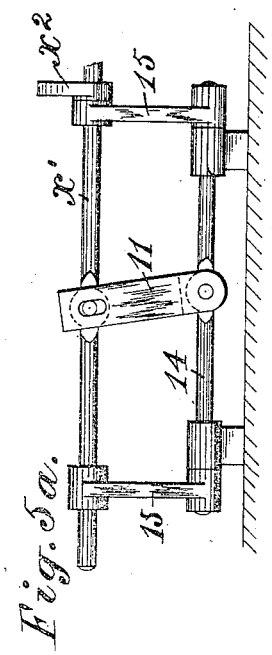
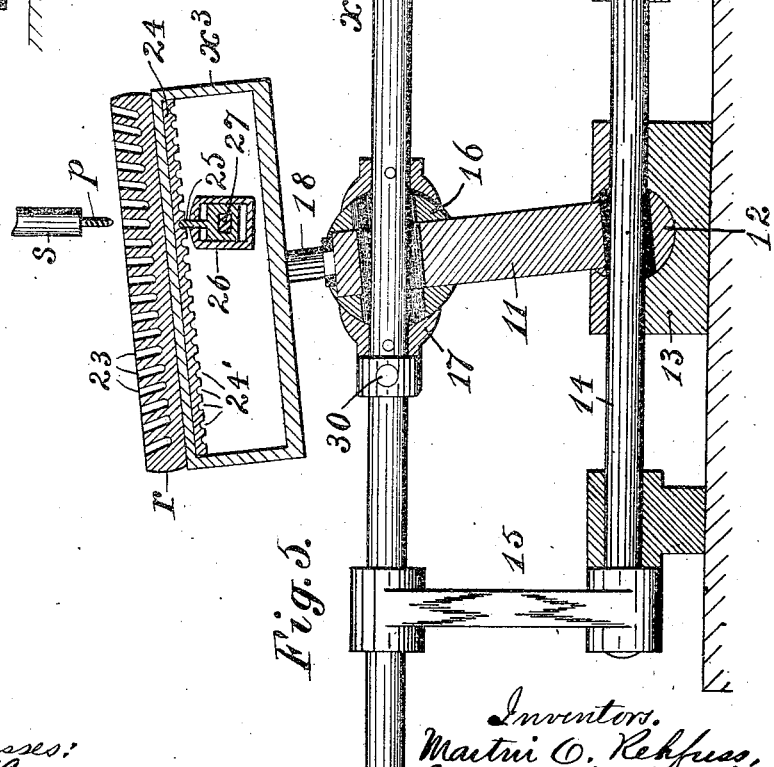
Witnesses:
L. Lee
Daison S. Purrington.
Inventors.
Martin O. Rehfuss,
Edward F. Buch,
per Thomas L. Crane, Atty.

No. 855,811. PATENTED JUNE 4, 1907.
M. O. REHFUSS & E. F. BUCH.
APPLIANCE FOR FEEDING BRUSH BLOCKS.
APPLICATION FILED DEC. 20, 1905.

7 SHEETS—SHEET 6

Witnesses:
L. Lee.
Daison D. Purrington.

Inventors.
Martin O. Rehfuss,
Edward F. Buch, per
Thomas S. Crane, Atty.

UNITED STATES PATENT OFFICE.

MARTIN O. REHFUSS, OF PHILADELPHIA, PENNSYLVANIA, AND EDWARD F. BUCH, OF ASTORIA, NEW YORK, ASSIGNORS, BY MESNE ASSIGNMENTS, TO SANITARY SECTIONAL BRUSH COMPANY, A CORPORATION OF NEW YORK.

APPLIANCE FOR FEEDING BRUSH-BLOCKS.

No. 855,811.     Specification of Letters Patent.     Patented June 4, 1907.

Application filed December 20, 1905. Serial No. 292,658.

*To all whom it may concern:*

Be it known that we, MARTIN O. REHFUSS, of 1417 South Broad street, Philadelphia, county of Philadelphia and State of Pennsylvania, and EDWARD F. BUCH, of Broadway and Academy streets, Astoria, county of Kings, and State of New York, have invented certain new and useful Improvements in Appliances for Feeding Brush-Blocks, fully described and represented in the following specification and the accompanying drawings, forming a part of the same.

The present invention relates to means for feeding the brush-block in transverse and longitudinal directions to present it automatically to suitable drilling or tufting devices, so that tuft-holes may be drilled in the brush-block, or tufts inserted at regular spaces in rows, and the rows also suitably spaced apart upon the block.

Special devices for drilling and tufting the blocks are shown in the annexed drawing, but are not described in detail nor claimed herein as such particular devices are made the subject of a separate application, No. 292,657 filed December 20, 1905 and entitled Machine for drilling and tufting brushes.

The present appliances for feeding brush-blocks embrace a brush-block holder which sustains the brush-block, a rock-shaft journaled beneath the drilling and tufting devices, a carrier for the block-holder pivoted at the axis of the rock-shaft, rocker-arms carried by the rock-shaft, a control-shaft movable lengthwise in the rocker-arms and extended through the holder and jointed to the same, a control-cam suitably actuated to shift the control-shaft longitudinally after the drilling or tufting of each hole in the block, and a rocker-cam actuated twice during each revolution of the control-cam, so as to shift the rocker-arms and move the block laterally, at the alternate ends of the rows, to space the same.

A cam-shaft is shown in connection with the drilling and tufting appliances, and a driving-cam is shown upon the gear which turns such cam-shaft for suitably turning the control-cam to actuate the brush-feeding appliances.

The invention consists in the features of construction hereinafter claimed, which will be understood by reference to the annexed drawing, in which—

Figure 7:
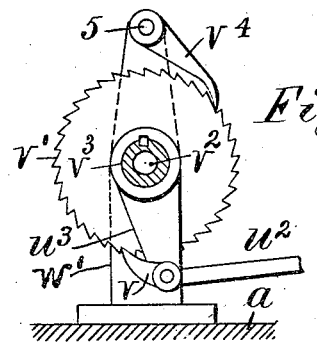
Figure 8:
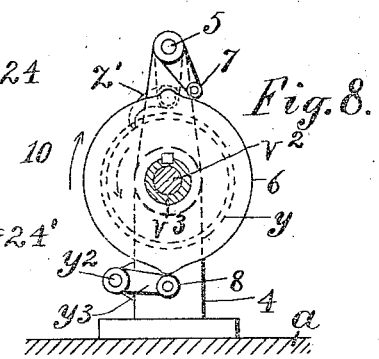
Figure 10:
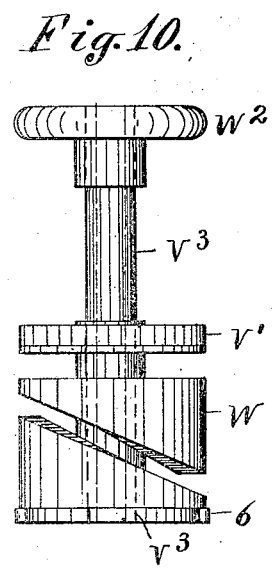
Figure 9:
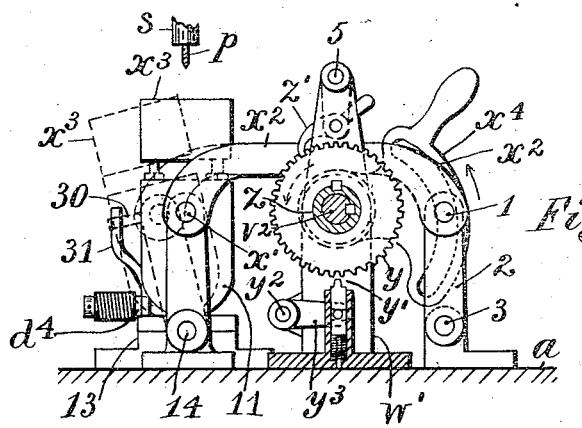
Figure 11:
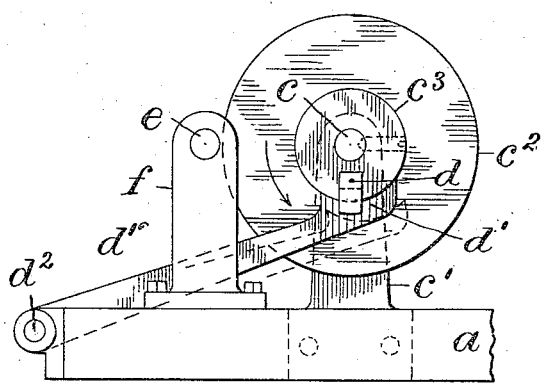
Figure 12:
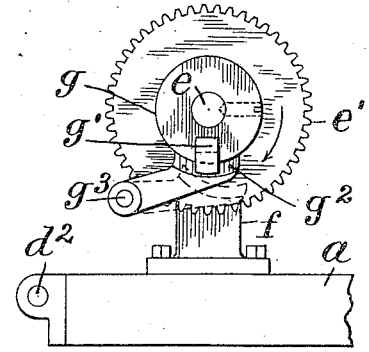
Figure 13:
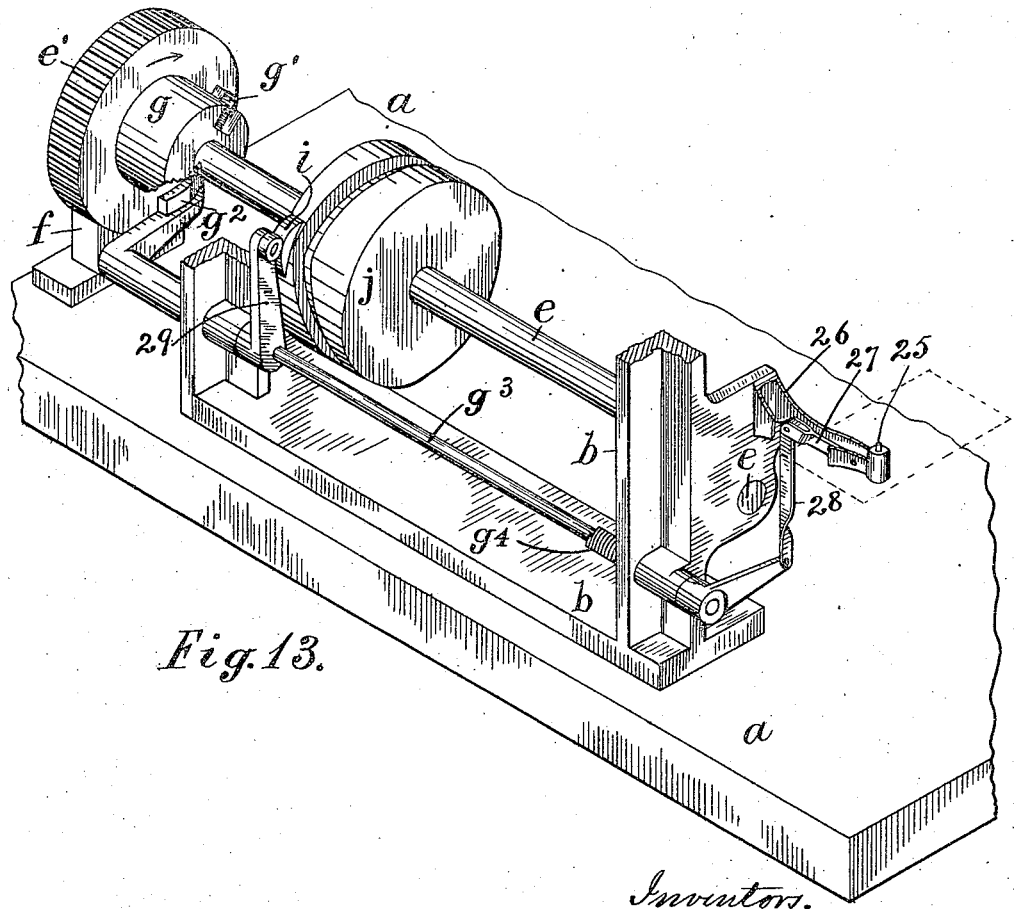

Figure 1 is a plan of the machine with the block-holder omitted and the frame broken away where it carries the tuft-feeding appliances, and two clutch-hubs with the part of the shaft which supports them are shown in dotted lines to expose the clutch-levers which lie normally below them. Fig. 2 is an elevation of the front end of the machine; Fig. 3 is an elevation of the right hand side; Fig. 4 an elevation of the left hand side; Fig. 5 is a longitudinal section, where hatched, at the center line of the brush-block holder; Fig. 5$^a$ is an elevation of a construction alternative to Fig. 5; Fig. 6 is an elevation of the block-carrier and locking-device, in cross section, where hatched, at the center line of the brush-block holder in Fig. 5; Fig. 6$^a$ shows the under side of the gage-plate; Fig. 7 is a cross section on line 7—7 in Fig. 1; Fig. 8 is a cross section on line 8—8 in Fig. 1; Fig. 9 is a cross section on line 9—9 in Fig. 1; and Fig. 10 is a side elevation of the control-cam, its ratchet-wheel and hand-wheel with their connecting sleeve. Fig. 11 is an elevation of the clutch and clutch-lever for the shaft $c$; Fig. 12 is an elevation of the clutch and clutch-lever for the shaft $e$; and Fig. 13 is a perspective view of the parts forming the clutch-control for the shaft $e$.

The machine is shown with a bed $a$ having frame $b$ to support the tufting and drilling appliances which are carried upon the top of such frame. A driving-shaft $c$ is mounted in bearings $c'$ upon the bed and provided with a pulley $c^2$ turning loosely upon the shaft between the outer bearing $c'$ and a clutch-hub $c^3$, which is shown in dotted lines in Fig. 1 to expose the clutch fixtures below it. A clutch-bolt $d$ is fitted to slide through the clutch-hub $c^4$ and when engaged with a notch in the hub of the pulley $c^2$ the motion of the pulley is transmitted to the driving-shaft; forming a well known detachable "press-clutch" in which the bolt is pressed normally into the notch by a spring; the spring not being shown in the drawing as such "press-clutches" are already well-known. A clutch-lever $d'$ is provided with a sloping face to engage the head of the clutch-bolt $d$, and when the lever is pressed against the side of the clutch-hub $c^3$, it retracts the bolt from the pulley and arrests the driving-shaft. The lever $d'$ is mounted upon a shaft $d^2$ provided with a spring $d^3$ to press the lever normally toward the clutch-hub $c^4$, and a latch $d^4$ serves when engaged with a stud $d^5$ to hold the clutch-lever inoperative until the completion of the brush drilling operation as hereinafter set forth. (See Figs. 1 and 2).

A cam-shaft $e$ is mounted in the bottom of the frame $b$ and connected with the driving-shaft $c$ by gears $e'$ and $e^2$, the gear $e'$ being fitted to turn upon the shaft between a bearing $f$ and a clutch-hub $g$. The hub $g$ is attached to shaft $e$ and is provided with a clutch-bolt $g'$ which is controlled by a clutch-lever $g^2$. The clutch-lever $g^2$ is mounted upon a shaft $g^3$ and pressed normally away from the clutch-hub $g$ by a spring $g^4$. (See Fig. 4).

Attached to the cam-shaft $e$ to rotate therewith are the following cams: The tufter-feed reciprocating means, which is not herein claimed or described in detail, is operated by the cam $h$ at the rear end of the cam-shaft; the clutch-lever $g^2$ is moved at intervals in opposite directions by a cam $i$ and also by a connection to a gage-plate in the block-holder, as hereinafter described, to stop the drill and tuft-driver at the ends of the rows, when tufting oval brush-blocks; the tuft-placer is operated by the cam $j$; the tufter and boring-head reciprocating means by the cam $k$; the tuft-inserting means by the cam $l$, and the boring means by the cam $m$. The cam $i$ will be described in connection with the brush-block holder, and the connections from the cam $j$ need no detail description herein. The cam $k$ operates through lever $k'$ to reciprocate a slide $n$ horizontally in the top of the frame $b$, such slide carrying a head $o$ in which a drill $p$ and tuft-driver $q$ are movable vertically; the movement of the slide $n$ shifting the head $o$ so as to bring the drill $p$ and the tuft-driver $q$ alternately over the same point in the brush-block $r$. The cam $l$ operates through a bell-crank $l'$ to reciprocate the tuft-driver $q$, and the cam $m$ operates through bell-crank $m'$, link $m^2$, and levers $m^3$ to reciprocate the spindle $s$ of the drill $p$.

The mechanism driven by the shaft $e$ is not claimed herein, but is referred to because the block-holder feeding-means is operated alternately therewith.

*Block-holder feeding-means.* A driving-cam $t$ which operates this feeding-means is attached to the gear-wheel $e'$ to revolve therewith, and it thus continues to operate the feeding mechanism when the shaft $e$ is stopped, which occurs by the automatic retraction of the clutch-bolt $g'$ at the ends of the rows of tuft-holes when tufting oval brushes, as hereinafter described. The cam $t$, by means of an arm $u$, oscillates a rock-shaft $u'$ which reciprocates a link $u^2$ to vibrate a pawl-arm $u^3$. The pawl-arm carries a pawl $v$ fitted to the teeth of a ratchet-wheel $v'$ which revolves around a shaft $v^2$. The ratchet-wheel is attached to a sleeve $v^3$ to revolve with a so-called control-cam $w$. The shaft $v^2$ is supported in bearings $w'$ and the sleeve $v^3$ is extended through the outer bearing $w'$ and provided with a hand-wheel $w^2$ to turn the control-cam by hand.

The control-cam has a double inclined slot in its periphery, and a pin $x$ is fitted to such slot and is carried by a slide $x^5$. The pin is fitted movably in the end of a control-shaft $x'$ which is jointed to the block-holder $x^3$. The pin $x$ moves the control-shaft to effect the longitudinal spacing of the tuft-holes. The control-shaft $x'$ is given a lateral movement, to effect the lateral spacing, by a link $x^2$ which is intermittingly moved by a rocker-cam $x^4$ attached to a sleeve $z$ with a rocker tooth-wheel $y$, and said sleeve attached to the shaft $v^2$ so that both revolve therewith. The link carries a pin 1 which is extended into an eccentric slot in the cam $x^4$ and the pin is supported movably by an arm 2 journaled in a bearing upon the bed, by a pivot 3.

Over the shaft $v^2$ a pawl-shaft 5 is mounted upon the standards of the bearings $w'$, and carries a detent $v^4$ for the ratchet-wheel $v'$. (Fig. 7.) Attached to one end of the cam $w$ is a pawl-cam 6 with projections at opposite sides of the center to oscillate the pawl-shaft. The pawl-shaft has two arms, one carrying a roll 7 to bear upon the pawl-cam 6, and the other arm carrying a pawl $z'$ to actuate the tooth-wheel $y$. The teeth on wheel $y$ are indicated only by dotted circles in Fig. 8. A spring 9, shown upon the end of the pawl-shaft in Figs. 1 and 2, is provided to move the pawl to turn the tooth-wheel $y$ when it is required to actuate the rocker-cam $x^4$. The cam 6 affects the rocker-cam $x^4$ twice in each rotation of the cam $w$. Upon the lower side of the tooth-wheel $y$, a spring-bolt $y'$ is provided to engage the tooth-wheel, and is pressed toward the wheel by a spring shown beneath its lower end in Fig. 9. A bolt-spindle $y^2$ is mounted adjacent to the locking-bolt, and arms $y^3$ are attached thereto, and one of them connected to the bolt by a pin and slot as shown in Fig. 9, while the other arm carries a roll 8 to contact with the two projections upon the pawl-cam 6, as shown in Fig. 8.

The rolls 7 and 8 are so arranged in relation to the opposite projections of the cam 6, that when the cam is rotated, as shown by the black arrow 10 in Fig. 8, the locking-bolt is first retracted, and the pawl-shaft 5 then actuated to retract the pawl 8. The passage of the cam beyond the roll 7 releases the pawl $z'$, and the spring 9 then moves the pawl and turns the cam $y$ in the reverse direction, indicated by the dotted arrows in Figs. 7 and 9.

The movement of the wheel one tooth partially rotates the cam $x^4$, which operates upon the pin to move the link $x^2$. The control-shaft is thus moved laterally by the rocker-cam $x^4$ and longitudinally by the control-cam $w$.

The control-shaft is jointed to the carrier 11 of the block-holder $x^3$, which is formed with a fulcrum-ball 12 at its lower end mounted in a bearing-block 13 fixed upon the bed $a$ beneath the drill and tuft-driver. A rock-shaft 14 is shown in Fig. 5 extended through the axis of the bearing-block, and rocker-arms 15 extended from the same to the control-shaft $x'$. Spherical segments 16 are shown fitted to the sides of the carrier 11 and cups 17 attached to the control-shaft to embrace the same, which permits the carrier to tip upon the bearing-block when the control-shaft moves lengthwise. The rocker-arms 15 are rigidly attached to the rock-shaft 14 and thus hold the control-shaft successively in parallel positions when the link $x^2$ is intermittingly actuated by the cam $y$.

The control-shaft slips through the rocker-arms when moved by the cam $w$, and the cam is thus adapted to rock the brush-block laterally and longitudinally, so as to make the tuft-holes 23 incline outwardly from the center when formed by a vertically moving drill.

The rocker-arms 15, with the control-shaft movable lengthwise through the same, forms the simplest mechanism for giving to the brush-holder the inclination in two directions upon its universal joint. The essential nature of this motion and the operation of the arms and control-shaft to produce it, is illustrated in Fig. 5$^a$ where the mechanism is shown more simplified by jointing the carrier 11 directly upon the rock-shaft 14 and forming a slotted connection between the carrier and the control-shaft $x'$. While this mechanism is simpler than that shown in Fig. 5, it is not preferred, as it does not afford the means of compensating for wear or taking up lost motion, like the globular joint upon the control-shaft and the divided bearing-block applied to the ball 12 upon the bottom of the carrier.

The block-holder $x^3$ is mounted upon the carrier 11 by shanks 18, which penetrate sockets 19 in the carrier and are provided with collars 20 to rest upon springs 21 fitted within the sockets to support the block-holder elastically. Threaded caps 22 are screwed into the sockets over the collars, and the block-holder is thus held normally at a certain level but may be depressed below the same by the shoulder of the drill-spindle $s$, as is required when the edges of the brush-block are tipped upwardly, to make the tuft-holes of uniform depth. The block-holder $x^3$ is shown in Figs. 5 and 6 as a hollow box open upon the front and back, with the brush-block $r$ supported upon its upper side and secured thereon by any suitable means. The block has the tuft-holes 23 formed therein and inclined outwardly from the center point, by the rocking of the carrier on its lower fulcrum.

*Locking of block-holder.* To lock the brush-holder in position for drilling each hole exactly in the proper place (independently of the shifting effected by the rocker-cam and control-cam) a gage-plate 24 having holes or recesses 24' is fitted within the top of the hollow block-holder, and a locking-pin 25 to engage the said holes is supported in a socket upon an arm 26 projected within the block-holder which holds the locking-pin in a direct line beneath the drill when drilling a hole. The pin requires to be retracted before each movement of the block-holder, and this is effected by the operation of the cam $i$. A lever 27 which actuates the locking-pin is pivoted upon the arm 26 and connected by a link 28 with the rock-shaft $g^3$, as shown in Figs. 4 and 6. The cam $i$ is formed as a projection upon the side of the cylindrical cam $j$ and operates upon an arm 29 attached to the shaft $g^3$. The spring $g^4$ upon the shaft $g^3$ presses the arm 29 normally against the cam $i$ and also presses the locking-pin normally into the holes of the gage-plate. The movement of retracting the locking-pin from the holes by the cam $i$ operates also to press the clutch-lever $g^2$ toward the clutch-hub $g$, but does not actuate the clutch-bolt $g'$, which does not move in proximity to such clutch-lever when the cam $i$ operates upon the arm 29. This is clearly shown in Fig. 13, where the clutch-lever is pressed upward to the hub, while the clutch-bolt is upon the opposite side of such hub, but is permitted normally to fall away from the hub before the clutch-bolt reaches the wedge-point of the lever. The gage-plate, as shown in Fig. 6$^a$, is formed with rows of holes 24' corresponding in their arrangement to that desired for the rows of bristle-tufts upon the brush-block; the design shown being adapted for an oval brush-block, in which the lateral rows are shorter than the middle rows.

The slot in the cam $w$ moves the control-shaft $x'$ so as to oscillate the brush-block uniformly, and if the drill were operated after each step-by-step movement of the control-shaft, the rows of tuft-holes would all be of uniform length; but the absence of holes in the gage-plate at the ends of the shorter rows, prevents the locking-pin from making its normal movement and thus holds the clutch-lever $g^2$ in the path of the locking-bolt, and retracts the bolt from the gear $e'$; thus stopping the drilling and tufting shaft $e$ until the intermittent movements of the brush-holder again bring one of the holes in line with the locking-pin. The penetration of the pin into such hole then operates to retract the clutch-lever from the clutch-bolt which again engages the rotating clutch-hub $g$, and causes the drilling and tufting mechanism to operate. The movement of the drill is thus controlled by the gage-plate, and the holes may therefore be drilled and tufted in any desired pattern upon the brush-block, although the block may be moved farther at each complete rotation of the control-cam than the length of the row that is drilled and tufted, the drilling and tufting devices being arrested at the ends of the row.

*Operation of the machine.* With the latch $d^4$ hooked upon the stud $d^5$, the rotation of the shaft $c$ operates to turn the cam-shaft $e$ and actuate the drilling and tufting appliances. The cam $t$ at the same time operates the rock-shaft $u'$ and the pawl $v$, thus turning the control-cam $w$ sufficiently, at each actuation of the tufting devices, to shift the control-shaft and block-holder longitudinally, to space the holes and tufts in the rows upon the brush-block.

The cam $w$ is so set in relation to the projections upon the cam 6, that when the block-holder is carried by the pin $x$ and control shaft $x'$ to either end of its longitudinal movement, the cam 6 operates the pawl $z'$ and slightly shifts the tooth-wheel $y$ and the rocker-cam $x^4$, which shifts the control-shaft and the block-holder laterally to drill an adjacent row. The cam $i$ is so disposed as to retract the pin 25 from the holes 24' in the gage-plate of the block-holder, prior to such actuation of the cams $w$ and $x^4$, and so long as the holes in the gage-plate are opposed to the pin to permit the pin's normal movement, the clutch-lever $g^2$ is held from contact with the clutch-bolt $g'$ and the drilling and tufting continues intermittently.

At the ends of the rows, where the holes are omitted, as with the oval design shown in Fig. 6ª, the movement of the pin is interrupted, and the clutch-lever $g^2$ is held against the clutch-hub $g$ throughout an entire rotation of the gear $e'$, which brings the clutch-bolt $g'$ in contact with the inclined face upon the lever and stops the clutch-hub and the cam-shaft $e$ from further rotation. The gear $e'$ continuing to revolve, the cam $t$ continues the actuation of the block-holder feeding-devices, which soon brings another hole in the gage-plate opposite to the pin 25, which permits the spring $g^4$ to turn the shaft $g^3$, and retract the clutch-lever $g^2$ from the clutch-hub $g$. The bolt $g'$ then automatically reengages the gear $e'$, and connects the shaft $e$ therewith and renews the drilling and tufting movements.

Several of such automatic machines may be managed by one operator, who secures the brush-blocks upon the block-holders, and engages the latch $d^4$ upon each, with the stud $d^5$, so as to hold the clutch-lever $d'$ inoperative throughout the drilling and tufting operation. Each machine is stopped automatically, when the tufting of the brush-block is completed, by a pin 30 movable with the carrier 11, arranged to engage an arm 31 upon the latch to lift the latter from the stud $d^5$. (See Figs. 1, 2 and 9.)

The drilling of the brush-block is commenced with the block-holder tipped inwardly toward the frame of the machine, as indicated by the dotted lines $x^3$ in Fig. 6, and the block-holder at the conclusion of the drilling movement is therefore tipped outwardly as indicated by the dotted lines $x^3$ in Fig. 9, which brings the pin 30 in line with the arm 31 upon the latch; and when the block-holder reaches its extreme left hand movement, as indicated in Fig. 9, the pin contacts with the arm 31 and disengages the latch from the stud $d^5$, thus permitting the spring $d^3$ to throw the clutch-lever $d'$ into the path of the clutch-bolt $d$ which, when engaging the inclined face $d'$ upon such clutch-lever, is retracted from the driving-pulley $c^2$. This stops the driving-shaft $c$ and the entire machine.

The re-engagement of the latch $d^4$ with the stud $d^5$ serves at any time to retract the clutch-lever $d'$ from the hub $c^3$ and re-connects the driving-pulley with the shaft $c$. The block-holder feeding means thus operates automatically from the commencement of drilling each block; but to provide for any special adjustment of the block before or during the drilling, the hand-wheel $w^2$ is provided, which enables the operator by turning the control-cam $w$ to shift the block-holder longitudinally to the end of, or to any point in, the row of tuft-holes. The block-holder may be set sidewise by hand, by means of handles shown upon the pawl $z'$ and rocker-cam $x^3$ in Fig. 9, the pawl being lifted from the tooth-wheel $y$, and the cam then oscillated, to move the block-holder laterally into any required position. Such manual adjustments permit the shifting of any hole in the brush-block from beneath the drilling and tufting appliances for removing a defective tuft, and then restoring the hole to its previous position for retufting.

From the above description it will be seen that the drilling and tufting is effected by one group of devices actuated by the cams upon the shaft $e$; while the feeding of the brush-blocks is effected by another group of devices actuated by the cam $t$ upon the gear $e'$, and that the cam-shaft $e$ is automatically disconnected from the gear $e'$ when the brush-block tufting mechanism is required to discontinue its movements at the ends of the rows of tuft-holes.

Having thus set forth the nature of the invention what is claimed herein is:

1. An appliance for feeding brush-blocks during the drilling and tufting of the same, comprising a brush-block holder, a rock-shaft journaled adjacent to the same, a carrier for the block-holder pivoted at the axis of the rock-shaft, rocker-arms carried by the rock-shaft, a control-shaft movable lengthwise therein and extended through the holder and jointed to the same, means to intermittingly shift the rocker-arms to space the rows of tuft-holes, and means to shift the control-shaft endwise to space the tuft-holes in the rows.

2. An appliance for feeding brush-blocks, comprising a brush-block holder, a rock-shaft journaled adjacent to the same, a carrier for the block-holder having a ball-bearing at the axis of the rock-shaft and perforated for the passage of the rock-shaft, rocker-arms carried by the rock-shaft with a control-shaft movable lengthwise therein and extended through the holder, a ball-joint connecting the control-shaft and holder, and means to shift the control-shaft endwise and to shift the rocker-arms laterally for spacing the rows of tuft-holes.

3. An appliance for feeding brush-blocks during the drilling and tufting of the same, comprising a brush-block holder, a rock-shaft journaled adjacent to the same, a carrier for the block-holder pivoted at the axis of the rock-shaft, rocker-arms carried by the rock-shaft, a control-shaft movable lengthwise therein and extended through the holder and jointed to the same, a rocker-cam with connections to intermittingly shift the rocker-arms, a pin having a transverse sliding connection with the end of the control-shaft, and a control-cam operating upon the pin to intermittingly shift the control-shaft endwise.

4. An appliance for feeding brush-blocks during the drilling and tufting of the same, comprising a brush-block holder having a carrier mounted to swing in two planes, a control-shaft for moving the carrier to space the holes in the rows upon the brush-block, a pin transverse to the line of the control-shaft the shaft having a transverse sliding connection therewith, a cylindrical control-cam having a doubly inclined groove adapted at intervals to shift the pin and control-shaft to space the tuft-holes in the rows, and a driving-cam with ratchet connections to turn the control-cam as required.

5. An appliance for feeding brush-blocks during the drilling and tufting of the same, comprising a brush-block holder, a rock-shaft journaled adjacent to the same, a carrier for the block-holder pivoted at the axis of the rock-shaft, rocker-arms carried by the rock-shaft with a control-shaft movable lengthwise therein and extended through the holder and jointed to the same, means to intermittingly shift the rocker-arms to space the rows of tuft-holes, a pin having a transverse sliding connection with the end of the control-shaft, and a control-cam with groove upon its periphery having opposed notches at intervals adapted to shift the pin and control-shaft and thereby move the brush-holder to space the holes in the rows, and to lock the pin after each shift of the same.

6. An appliance for feeding brush-blocks during the drilling and tufting of the same, comprising a brush-block holder, a rock-shaft journaled adjacent to the same, a carrier for the block-holder pivoted at the axis of the rock-shaft, rocker-arms carried by the rock-shaft with a control-shaft movable lengthwise therein and extended through the holder and jointed to the same, means to intermittingly shift the rocker-arms to space the rows of tuft-holes, a control-cam with groove upon its periphery adjacent to the end of the control-shaft, a slide movable between the control-cam and the control-shaft, and a pin attached rigidly to the slide and having a transverse sliding connection with the end of the control-shaft and projected into the groove of the control-cam, whereby the pin is movable only in a straight line and the control-shaft is enabled to move laterally with the rocker-arms.

7. An appliance for feeding brush-blocks during the drilling and tufting of the same, comprising a brush-block holder, a rock-shaft journaled beneath the same, a carrier for the block-holder pivoted at the axis of the rock-shaft, rocker-arms carried by the rock-shaft with a control-shaft movable lengthwise therein and extended through the holder and jointed to the same, a link jointed at one end to the control-shaft and having a cam-pin at the opposite end, and a rocker-cam engaging such pin, with means for actuating the same to shift the link and arms intermittingly, to space the rows of tuft-holes upon the brush-block.

8. An appliance for feeding brush-blocks during the drilling and tufting of the same, comprising a brush-block holder, a rock-shaft journaled beneath the same, a carrier for the block-holder pivoted at the axis of the rock-shaft, rocker-arms carried by the rock-shaft with a control-shaft movable lengthwise therein and extended through the holder and jointed to the same, a link jointed at one end to the control-shaft and having a cam-pin at the opposite end, a rocker-cam engaging such pin to shift the link and arms intermittingly, an arbor carrying such rocker-cam with a toothed wheel for driving such cam, a pin having a transverse sliding connection with the control-shaft, a control-cam with groove engaging such pin and mounted upon the same arbor, and means, as the pawl $z'$ and pawl-cam 6 movable with the control-cam, to operate the toothed wheel and rocker-cam twice for each rotation of the control-cam.

9. An appliance for feeding brush-blocks during the drilling and tufting of the same, comprising a brush-block holder, a rock-shaft journaled beneath the same, a carrier for the block-holder pivoted at the axis of the rock-shaft, rocker-arms carried by the rock-shaft with a control-shaft movable lengthwise therein and extended through the holder and jointed to the same, a link jointed at one end to the control-shaft and having a cam-pin at the opposite end, a rocker-cam engaging such pin to shift the link and arms intermittingly, bearings at one side of the control-shaft, an arbor mounted therein with the rocker-cam pivoted thereon, a toothed wheel upon the arbor connected with the rocker-cam, a pin having a transverse sliding connection with the end of the control-shaft, a control-cam journaled upon the arbor and having a groove engaging such pin, a sleeve fitted to the control-cam and provided with a ratchet-wheel and with a hand-wheel, a pawl for intermittingly turning the ratchet-wheel and control-cam, and a driving-cam for actuating the pawl.

10. An appliance for feeding brush-blocks during the drilling and tufting of the same, comprising a brush-block holder, a rock-shaft journaled beneath the same, a carrier for the block-holder pivoted at the axis of the rock-shaft, rocker-arms carried by the rock-shaft with a control-shaft movable lengthwise therein and extended through the holder and jointed to the same, a link jointed at one end to the control-shaft and having a cam-pin at the opposite end, a rocker-cam engaging such pin to shift the link and arms intermittingly, bearings at one side of the control-shaft, an arbor mounted therein with the rocker-cam pivoted thereon, a toothed wheel upon the arbor connected with the rocker-cam, a pin having a transverse sliding connection with the end of the control-shaft, a control-cam journaled upon the arbor with a groove engaging such pin, a pawl-cam with two projections rotated by the control-cam, a pawl for actuating the toothed wheel, and an arm actuated by the pawl-cam to reciprocate the pawl twice for each rotation of the control-cam.

11. The combination, with means for drilling and tufting brush-blocks, of the cam-shaft $e$ for actuating such means and having the driving-cam $t$ thereon, a brush-holder having a rock-shaft journaled beneath the drilling and tufting devices, a carrier for the holder pivoted at the axis of the rock-shaft, rocker-arms carried by the rock-shaft, a control-shaft movable lengthwise therein and extended through the holder and jointed to the same, a rocker-cam and connections to intermittingly shift the rocker-arms, a control-cam and connections to intermittingly shift the control-shaft endwise, and means actuated by the driving-cam to intermittingly rotate the control-cam, and to actuate the rocker-cam twice for each rotation of the control-cam.

12. In a brush-block feeding device, the hollow block-holder mounted upon the carrier 11 having universal joint at its lower end disposed below the working position of the drill, changeable control and rocker-cams for feeding the holder transversely and longitudinally as described, the gage-plate having holes 24' and secured detachably within the holder to make it interchangeable, an arm projected inside the holder, and a locking-pin supported upon the arm with means for engaging it with the holes in the gage-plate.

13. In a brush-block feeding device, the combination, with a drill operating in a constant position, of a hollow brush-block holder mounted upon a carrier, means for feeding the carrier laterally and longitudinally to space the tuft-holes upon the block, the holder supporting the brush-block upon its outer side, and its inner side being flat with a gage-plate 24 secured detachably thereto and provided with recesses 24' arranged in the design desired for the drilling of the brush block, the arm 26 extended within the hollow holder and having the socket with locking-pin 25 movable therein, the lever 27 and spring $g^4$ to press the locking-pin normally into the recess 24', the driving-shaft $e$ connected with the drill by the clutch-bolt $g'$, and means actuated by the locking-pin when held outwardly by the face of the gage-plate, for withdrawing the clutch-bolt and stopping the movement of the drill.

14. In a brush-block feeding device, the combination, with a drill operating in a constant position, of a brush-block holder mounted upon a carrier, means for supporting the carrier movable in a lateral and longitudinal direction to space tuft-holes upon the brush-block, a driving-shaft with a clutch and connections for operating such feeding means, an arm for disengaging the clutch to stop such feeding means, a spring to operate the arm normally, a latch mounted adjacent to the carrier for holding the arm inoperative, and a projection upon the carrier adapted, when the carrier is moving in its extreme lateral position at the close of the drilling operation, to engage the latch and release the same to stop the feeding means automatically.

15. In a brush-block feeding-device, the combination, with a drill operating in a constant position, of a brush-block-holder mounted upon the carrier 11, means for feeding the carrier laterally and longitudinally to space the tuft-holes upon the block, the driving-shaft $c$ with a clutch-bolt $d$ and connections for operating such feeding means, the arm $d'$ for disengaging the clutch to stop such feed, the tooth $d^5$ adjacent to the carrier, the latch $d^4$ for holding the clutch-arm $d'$ inoperative when the latch is engaged with such tooth, and the projection 30 upon the carrier adapted, when the carrier is moving in its extreme lateral position at the close of the drilling operation, to engage the latch and release the same from the tooth, whereby the feed is automatically stopped when the brush-block is wholly bored.

In testimony whereof we have hereunto set our hands in the presence of two subscribing witnesses.

MARTIN O. REHFUSS.
   EDWARD F. BUCH.

Witnesses as to M. O. Rehfuss:
 HARRY M. McBURNEY,
 THOMAS S. CRANE.

Witnesses as to E. F. Buch:
 L. LEE,
 THOMAS S. CRANE.